United States Patent Office 3,657,240
Patented Apr. 18, 1972

3,657,240
PROCESS FOR THE PREPARATION OF TETRA-
HYDROPYRIMIDOISOINDOLOLS
Theodore S. Sulkowski, Wayne, Pa., assignor to American
Home Products Corporation, New York, N.Y.
No Drawing. Continuation-in-part of applications Ser. No.
487,587, Sept. 15, 1965, Ser. No. 576,833, Sept. 2,
1966, Ser. No. 622,929, Mar. 14, 1967, Ser. No. 723,587,
Apr. 23, 1968, and Ser. No. 757,775, Sept. 5, 1968. This
application Oct. 24, 1969, Ser. No. 869,327
Int. Cl. C07d 51/46
U.S. Cl. 260—251 A
13 Claims

ABSTRACT OF THE DISCLOSURE

This invention is concerned with the process of reacting 2,3,4,6 - tetrahydropyrimido[2,1 - a]isoindol - 6 - one with lithium compounds to prepare tetrahydropyrimidoisoindolols which are pharmacologically active as antidepressant and diuretic agents.

This application is a continuation-in-part of United States patent applications, copending Ser. No. 757,775, entitled "Process For The Preparation of Tetrahydropyrimidoisoindolols," filed on Sept. 5, 1968, and now abandoned; Ser. No. 723,587, entitled "Process For the Preparation of Tetrahydropyrimidinyl Phenyl Carbonyl Compounds," filed Apr. 23, 1968 and now abandoned; Ser. No. 622,929, entitled "Process For The Preparation of Tetrahydropyrimidinyl Phenyl Carbonyl Compounds," filed Mar. 14, 1967 and now abandoned; Ser. No. 576,833, entitled "2-(3-Aminopropyl)Isoindoles and Related Compounds," filed Sept. 2, 1966 and now abandoned and Ser. No. 487,587, entitled "1,2,3,4,6,10b-Hexahydropyrimido-[2,1-a]Isoindol-6-Ones and Related Compounds," filed Sept. 15, 1965 and now abandoned.

This invention relates to a new and novel process for the preparation of tetrahydropyrimidoisoindolols. In particular, it is concerned with the preparation of 2,3,4,6-tetrahydropyrimido[2,1-a]isoindol-6-ols which in standard and acceptable tests have exhibited pharmacological activity as antidepressant and diuretic agents.

The new and novel process of the present invention is exemplified by the following reaction scheme:

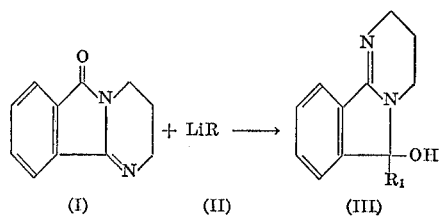

wherein R is selected from the group consisting of aluminum hydride, lower alkyl, phen(lower)alkyl, phenyl, monohalophenyl, dihalophenyl, mono(lower)alkylphenyl, di(lower)alkylphenyl, trifluoromethylphenyl, mono(lower)alkoxyphenyl, di(lower)alkoxyphenyl(thienyl, pyridyl, furyl and tetrahydro-2-naphthyl, and $R_1$ is selected from the group consisting of hydrogen, lower alkyl, phen (lower) alkyl, phenyl, monohalophenyl, dihalophenyl, mono-(lower)alkylphenyl, di(lower)alkylphenyl, trifluoromethylphenyl, mono(lower)alkoxyphenyl, di(lower)alkoxyphenyl, thienyl, pyridyl, furyl and tetrahydro-2-naphthyl. As employed herein the terms "lower alkyl," "lower alkoxy" and the like are meant to include both branched and straight chain moieties having from one to about six carbon atoms.

The process of this invention is effected by admixing 2,3,4,6 - tetrahydropyrimido[2,1 - a]isoindol - 6 - one (I) with an appropriate lithium compound (II) in an anhydrous, reaction-inert, organic solvent at a temperature range from about 30° C. to about 140° C. for a period of from about one to about twenty hours. Preferably, this reaction is conducted in anhydrous ether at the reflux temperature of the reaction mixture for a period of about two hours.

When the reaction is complete the excess lithium compound is hydrolyzed by the addition of water and the product (III), a tetrahydropyrimidoisoindolol, is obtained by standard recovery procedures. For example, the organic phase my be separated and evaporated to dryness. The residue contains the final product (III) which may be recrystallized from an appropriate solvent, such as dimethylformamide or dimethylacetamide.

The compounds prepared by the new and novel process of this invention were at first though to be "Hexahydropyrimidoisoindolones" and were so described in the first prior filed parent application (U.S. Ser. No. 487,587). Subsequently, these compounds were re-examined and then thought to be "Tetrahydropyrimidinyl Phenyl Carbonyl Compounds" and were so defined in the following three subsequently filed parent applications (U.S. Ser. Nos. 576,833; 622,929 and 723,587). It has now been concluded, based on the nature of the starting materials; the mode of synthesis; the elemental analysis; and the ultra violet and infra red spectrographic analyses, that all the solid bases prepared by the process of this invention are "Tetrahydropyrimidoisoindolols" (III). Further, since these tetrahydropyrimidoisoindolols are basic they will react with pharmacologically acceptable acids to form acid addition salts. Such acids are well known in the art, for example, hydrochloric, hydrobromic, hydroiodic, sulfuric, nitric, phosphoric, acetic, lactic, citric, tartaric, maleic, gluconic, benzenesulfonic, toluenesulfonic, methylsulfonic, ethylsulfonic acids and the like. These salts may be prepared by procedures commonly employed in the art, for example, reacting the compound with an equivalent of the selected acid in aqueous solution and concentration of the solution. Other known procedures may also be employed.

The ultra violet spectrographic analyses of the herein described tetrahydropyrimidoisoindolols and their acid addition salts which are substituted in the 6-position with an aromatic group, e.g. phenyl, monohalophenyl, dihalophenyl, mono(lower)alkylphenyl, di(lower)alkylphenyl, trifluoromethylphenyl, mono(lower)alkoxyphenyl, di-(lower)alkoxyphenyl, thienyl, pyridyl, furyl and tetrahydro-2-naphthyl, demonstrate on absence of absorption in the 250 m$\mu$ region indicating that both the bases and salts possess the tetrahydropyrimidoisoindolol structures in solution. Alternatively, ultra violet analyses of neutral and acidic solutions of these tetrahydropyrimidoisoindolols and their acid addition salts which are unsubstituted, e.g. hydrogen or substituted in the 6-position with an aliphatic or aralkyl group, e.g. lower alkyl and phen(lower)alkyl demonstrate absorption in the 235–240 m$\mu$ region indicating that their structures are predominately the tetrahydropyrimidinyl phenyl carbonyl compounds of the structure in solution:

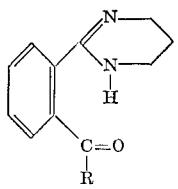

where R is hydrogen, lower alkyl and phen(lower)alkyl. Further, the infra red spectrographic analyses of these latter compounds determined by the procedure of Hofman et al., Analyt. Chem., vol. 39, p. 406 (1967) also indicates that the solid acid addition salts thereof also exist in the above shown tetrahydropyrimidinyl phenyl carbonyl forms.

The 2,3,4,6-tetrahydropyrimido[2,1-a]isoindol - 6 - one (I) employed in the process of this invention is prepared by reacting phthalic anhydride with 1,3-diaminopropane as described in copending U.S. patent application, Ser. No. 757,774 entitled "2,3,4,6-Tetrahydro[2,1-a]Isoindol-6-One and a Process For Its Preparation," submitted for filing to the United States Patent Office on the same day as the Ser. No. 757,775 by Theodore S. Sulkowski, and now U.S. Pat. 3,507,867, granted Apr. 21, 1970, which is a continuation-in-part of United States patent applications, Ser. No. 622,930, entitled "2,3,4,6-Tetrahydro[2, 1-a]Isoindol-6-One" filed on Mar. 14, 1967 and now abandoned; Ser. No. 576,833, entitled "2-(3-Aminopropyl) Isoindoles and Related Compounds," filed Sept. 2, 1966 and now abandoned; and Ser. No. 487,587, entitled "1,2,3,4,6,10b - Hexahydropyrimido[2,1 - a]Isoindol-6-Ones," filed on Sept. 15, 1965 and now abandoned. The lithium compounds (II) which are the other reactants employed in this process are commercially available or may be readily prepared by standard organic procedures well known to those skilled in the art of organic chemistry. By "anhydrous, reaction-inert, organic solvent" as employed herein is meant an anhydrous organic solvent which dissolves the reactants but does not react with them under the above-described reaction conditions. Many such solvents will suggest themselves to those skilled in the art, in this regard, excellent results can be obtained with anhydrous solvents such as benzene, dioxan, ethyl ether, diisopropyl ether, ether, ethylene glycol dimethylether and diethylene glycol dimethylether. The time and temperature ranges employed in the process of this invention are not critical and simply represent the most convenient ranges consistent with carrying out the reaction in a minimum of time without undue difficulty. Thus, reaction temperatures appreciably below these can be used, but their use considerably extends the reaction time. Similarly, reaction temperatures higher than those mentioned can be employed with a concomitant decrease in reaction time.

The tetrahydropyrimidoisoindolol compounds (II) prepared by the process of this invention have been found to possess valuable pharmacological activity. More particularly, these compounds have exhibited utility, in standard pharmacological tests, as diuretic and antidepressant agents. These tetrahydropyrimidoisoindolol compounds (III) are described and claimed in copending United States patent application, Ser. No. 757,792, entitled "Tetrahydropyrimidinyl Phenyl Carbonyl Acid Addition Salts, Imidazolinyl Phenyl Carbonyl Acid Addition Salts and Related Compounds," submitted for filing to the United States Patent Office on the same day as the Ser. No. 757,-775, by Theodore S. Sulkowski, which is a continuation-in-part of United States patent applications, Ser. No. 622,-918, entitled "Tetrahydropyrimidinyl Phenyl Carbonyl and Imidazolinyl Phenyl Carbonyl Compounds," filed on Mar. 14, 1967 and now abandoned; Ser. No. 576,833, entitled "2-(3-Aminopropyl-Isoindoles and Related Compounds," filed Sept. 2, 1966 and now abandoned and Ser. No. 487,587, entitled "1,2,3,4,6,10b-Hexahydropyrimido [2,1-a]Isoindol-6-Ones" filed Sept. 15, 1965 and now abandoned. In this copending and cofiled application, the tetrahydropyrimidoisoindolol compounds prepared by the process of this invention are described as useful antidepressant agents having mood elevating properties as psychic energizers when administrated orally to mice by the procedure described by Rubin et al., in J.P.E.T. 120, 125 (1957) in the dosage range from about 1 to about 100 mg./kilo of animal body weight. Further, these tetrahydropyrimidoisoindolol compounds are also useful as diuretic agents when administered orally to rats by the procedure described by Lipschitz et al., in J. Pharmacol. 79, 97, (1943) in the dosage range from about 0.25 to about 25 mg./kilo of animal body weight.

When the tetrahydropyrimidoisoindolol compounds which are prepared by the process of the present invention are employed as anti-depressant and diuretic agents, they may be administered to warm-blooded animals, e.g., mice, rats, rabbits, dogs, cats, monkeys, etc. alone or in combination with pharmacologically acceptable carriers, the proportion of which is determined by the solubility and chemical nature of the compounds, chosen route of administration and standard biological practice. For example, they may be administered orally in the form containing such excipients as starch, milk sugar, certain types of clay and so forth. They may also be administered orally in the form of solutions or they may be injected parenterally. For parenteral administration they may be used in the form of a sterial solution containing other solutes, for example, enough saline or glucose to make the solution isotonic.

The dosage of these tetrahydropyrimidoisonidolol compounds will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration:

EXAMPLE I

Thirty grams of 2,3,4,6-tetrahydropyrimido[2,1-a]isoindol-6-one are added in portions to a stirred suspension of 10 g. of lithium aluminum hydride in 500 ml. of anhydrous diisopropyl ether. The mixture is stirred and heated to 50° C. for 18 hours. The excess hydride is decomposed by careful addition of water. Thereafter the mixture is filtered and the separated solid is extracted three times with 500 ml. of boiling ethanol. The extracts are combined and evaporated to dryness. The solid residue is slurried with hot water and separated by filtration. On recrystallization from dimethylformamide there is obtained 2,3,4,6 - tetrahydropyrimido[2,1-a]isoindol-6-ol, M.P. 205–7° C., dec., as a white crystalline solid which is insoluble in water and slightly soluble in dimethylacetamide.

*Analysis.*—Ultra violet absorption (95% ETOH) max. 235 m$\mu$ ($\epsilon$=12,400), infl. 266.5 m$\mu$ ($\epsilon$=3,650); ultra violet absorption (pH 1) max. 240 m$\mu$ ($\epsilon$=10,800), infl. 266.5 m$\mu$ ($\epsilon$=3,650); infra red absorption (KBr) 1640 cm.$^{-1}$, 2300–3000 cm.$^{-1}$; infra red absorption of the in situ hydrochloride by the above-identified procedure (KBr) 1670 cm.$^{-1}$, 2600–3100 cm.$^{-1}$.

Calc'd for $C_{11}H_{12}N_2O$ (percent): C, 70.18; H, 6.42; N, 14.88. Found (percent): C, 69.92; H, 6.47; N, 14.71.

EXAMPLE II

A solution of 18 grams of 2,3,4,6-tetrahydropyrimido-[2,1-a]isoindol-6-one in 500 ml. of anhydrous ether is added dropwise with stirring to a solution of phenyl lithium (prepared from 31 g. of bromobenzene and 3 g. of lithium metal) in 75 ml. of anhydrous ether. The mixture is stirred and refluxed an additional hour. After hydrolysis of the reaction mixture with water, the precipitated solid is separated by filtration. After recrystallization from dimethylacetamide there is obtained 2,3,4,6-tetrahydro-6-phenylpyrimido[2,1-a]isoindol-6-ol, M.P. 255–7° C. dec., as white prisms which is insoluble in water and slightly soluble in hot dimethylacetamide.

*Analysis.*—Ultra violet absorption (95% ETOH) max. 233 m$\mu$ ($\epsilon$=14,000), max. 268 m$\mu$ ($\epsilon$=4,000), infl. 271 m$\mu$ ($\epsilon$=3,000); ultra violet absorption (pH 1) max. 239 m$\mu$ ($\epsilon$=14,900), infl. 271 m$\mu$ ($\epsilon$=3,000); infra red absorption (KBr) 1650 cm.$^{-1}$, 2300–3000 cm.$^{-1}$.

Calc'd for $C_{17}H_{16}N_2O$ (percent): C, 77.25; H, 6.10; N, 10.60. Found (percent): C, 77.36; H, 6.05; N, 10.51.

In a similar manner, 2,3,4,6-tetrahydro-6-(2-pyridyl)pyrimido[2,1-a]isoindol-6-ol is synthesized by the interaction of 2,3,4,6-tetrahydropyrimido[2,1-a]isoindol-6-one with 2-pyridyl lithium.

Further, 6-(2-furyl)-2,3,4,6-tetrahydropyrimido[2,1-a] isoindol-6-ol is obtained by the reaction of 2,3,4,6-tetrahydropyrimido[2,1-a]isoindol-6-one with 2-furyl lithium.

EXAMPLE III

A solution of 7.5 grams of 2,3,4,6-tetrahydropyrimido-[2,1-a]isoindol-6-one in 250 ml. of anhydrous dioxan is added dropwise with stirring to a solution of 1.5 g. of methyl lithium in 75 ml. of ether. The mixture is stirred and refluxed for one hour, then hydrolyzed by the addition of water. The dioxan layer is separated and evaporated to dryness. On recrystallization of the residue from aqueous ethanol there is obtained 2,3,4,6-tetrahydro-6-methylpyrimido[2,1-a]isoindol-6-ol, M.P. 199–201° C., as a white crystalline solid which is insoluble in water and soluble in dimethylacetamide.

*Analysis.*—Ultra violet absorption (95% ETOH) max. 236 m$\mu$ ($\epsilon$=12,600), infl. 265 m$\mu$ ($\epsilon$=4,100); ultra violet absorption (pH 1) max. 239.5 m$\mu$ ($\epsilon$=14,200), infl. 265 m$\mu$ ($\epsilon$=4,100); infra red absorption (KBr), 1640 cm.$^{-1}$, 2300–3000 cm.$^{-1}$; infra red absorption of the in situ hydrochloride salt by the procedure of Hofmann et al., Analyt. Chem. vol. 39, p. 406 (1967) (KBr) 1670 cm.$^{-1}$, 1647 cm.$^{-1}$, 2600–3100 cm.$^{-1}$.

Calc'd for $C_{12}H_{14}N_2O$ (percent): C, 71.26; H, 6.98; N, 13.87. Found (percent): C, 71.30; H, 6.90; N, 13.63.

In a similar manner, 6-amyl-2,3,4,6-tetrahydropyrimido-[2,1-a]isoindol-6-ol is synthesized.

EXAMPLE IV

A solution of 15 grams of 2,3,4,6-tetrahydropyrimido-[2,1-a]isoindol-6-one in 500 ml. of anhydrous ethyl ether is slowly added to a stirring solution of 3.0 g. of n-butyl lithium in 150 ml. of ethyl ether. The mixture is heated to 35° C. with stirring for twelve hours and then hydrolyzed by the addition of water. The ethyl ether layer is separated and evaporated to dryness. On recrystallization from methanol there is obtained 6-butyl-2,3,4,6-tetrahydropyrimido[2,1-a]isoindol-6-ol., M.P. 181–3° C., as a white crystalline solid which is insoluble in water and soluble in ethanol and dimethylacetamide.

*Analysis.*—Ultra violet absorption (95% ETOH) max. 234.5 m$\mu$ ($\epsilon$=12,100), infl. 266 m$\mu$ ($\epsilon$=4,000); ultra violet absorption (pH 1) max. 240 m$\mu$ ($\epsilon$=14,000), infl. 266 m$\mu$ ($\epsilon$=4,000); infra red absorption (KBr) 1640 cm.$^{-1}$, 2300–3000 cm.$^{-1}$; infra red absorption of the in situ hydrochloride by the above-identified procedure (KBr) 1670 cm.$^{-1}$, 1640 cm.$^{-1}$, 2600–3100 cm.$^{-1}$.

Calc'd for $C_{15}H_{20}N_2O$ (percent) C, 73.73; H, 8.25; N, 11.47. Found (percent): C, 74.03; H, 7.99; N, 11.63.

Repeating the above procedure with appropriate starting materials the following compounds are produced:

6 - (4 - chlorophenyl) - 2,3,4,6-tetrahydropyrimido-[2,1-a] isoindol-6-ol, M.P. 274–6° C. dec., which is insoluble in water and soluble in dimethylacetamide.

*Analysis.*—Ultra violet absorption (95% ETOH) max. 224 m$\mu$ ($\epsilon$=23,000), infl. 243 m$\mu$ ($\epsilon$=12,000), max. 267 m$\mu$ ($\epsilon$=3,800); ultra violet absorption (pH 1) max. 223 m$\mu$ ($\epsilon$=21,100), infl. 243 m$\mu$ ($\epsilon$=14,200), max. 267 m$\mu$ ($\epsilon$=3,800); infra red absorption (KBr) 1652 cm.$^{-1}$, 2400–3000 cm.$^{-1}$.

Calc'd. for $C_{17}H_{15}ClN_2O$ (percent): C, 68.33; H, 5.06; N, 9.33; Cl, 11.87. Found (percent): C, 68.12; H, 5.39; N, 9.22; Cl, 11.85.

6 - (3,4 - dichlorophenyl)-2,3,4,6-tetrahydropyrimido [2,1-a]isoindol-6-ol, M.P. 267–9° C., as a white crystalline solid which is insoluble in water and slightly soluble in hot dimethylacetamide.

*Analysis.*—Ultra violet absorption (95% ETOH) infl. 230 m$\mu$ ($\epsilon$=22,600), max. 268 m$\mu$ ($\epsilon$=4,500); infl. 282 m$\mu$ ($\epsilon$=2,000); ultra violet absorption (pH 1) max. 228 m$\mu$ ($\epsilon$=22,000), max. 268 m$\mu$ ($\epsilon$=4,700); infl. 282 m$\mu$ ($\epsilon$=1,600); infra red absorption (KBr) 1650 cm.$^{-1}$, 2300–3000 cm.$^{-1}$.

Calc'd. for $C_{17}H_{14}Cl_2H_2O$ (percent): C, 61.27; H, 4.24; N, 8.41; Cl, 21.29. Found (percent): C, 61.41; H, 4.28; N, 8.46; Cl, 21.2.

6 - (4 - bromophenyl) - 2,3,4,6-tetrahydropyrimido-[2,1-a]isoindol-6-ol, M.P. 278–9° C. dec., as a white crystalline solid which is insoluble in water and slightly soluble in dimethylacetamide.

*Analysis.*—Ultra violet absorption (95% ETOH) max. 228 m$\mu$ ($\epsilon$=22,500), max. 267 m$\mu$ ($\epsilon$=4,300); ultra violet absorption (pH 1) max. 229 m$\mu$ ($\epsilon$=21,500), max. 267 m$\mu$ ($\epsilon$=4,300); infra red absorption (KBr) 1645 cm.$^{-1}$, 2300–2900 cm.$^{-1}$.

Calc'd. for $C_{17}H_{15}BrN_2O$ (percent): C, 59.48; N, 4.41; N, 8.16. Found (percent): C, 59.51; H, 4.36; N, 8.26.

6 - (5,6,7,8 - tetrahydro - 2-naphthyl)-2,3,4,6-tetrahydropyrimido[2,1-a]isoindol-6-ol, M.P. 253–5° C. dec., as a white crystalline solid which is insoluble in water and soluble in hot dimethylacetamide.

*Analysis.*—Ultra violet absorption (95% ETOH) infl. 230 m$\mu$ ($\epsilon$=10,000), infl. 245 m$\mu$ ($\epsilon$=9,200), max. 270 m$\mu$ ($\epsilon$=3,200); ultra violet absorption (pH 1) infl. 230 m$\mu$ ($\epsilon$=10,900), infl. 245 m$\mu$ ($\epsilon$=10,000), max. 270 m$\mu$ ($\epsilon$=3,200); infra red absorption KBr) 1655 cm.$^{-1}$, 2300–3000 cm.$^{-1}$.

Calc'd for $C_{21}H_{22}N_2O$ (percent): C, 79.21; H, 6.96; N, 8.80. Found (percent): C, 78.96; H, 7.15; N, 8.95.

6 - benzyl - 2,3,4,6 - tetrahydropyrimido[2,1-a]isoindol-6-ol, M.P. 233–5° C. dec., as a white crystalline solid which is insoluble in water.

*Analysis.*—Ultra violet absorption (95% ETOH) max. 235 m$\mu$ ($\epsilon$=11,700), infl. 269 m$\mu$ ($\epsilon$=3,900); ultra violet absorption (pH 1) max. 240 m$\mu$ ($\epsilon$=12,900), infl. 269 m$\mu$ ($\epsilon$=3,900); infra red absorption (KBr) 1645 cm.$^{-1}$, 2300–3000 cm.$^{-1}$; infra red absorption of the in situ hydrochloride by the above-indentified procedure (KBr) 1665 cm.$^{-1}$, 2600–3,000 cm. $^{-1}$.

Calc'd. for $C_{18}H_{18}N_2O$ (percent): C, 77.66; H, 6.52; N, 10.07. Found (percent): C, 77.67; H, 6.41; N, 9.77.

6 - (3 - amino - 4 - chlorophenyl)-2,3,4,6-tetrahydropyrimindo[2,1-a]isoindol-6-ol, M.P. 227–8° C. dec., as a white crystalline solid which is insoluble in water and soluble in hot dimethylacetamide.

*Analysis.*—Calc'd. for $C_{17}H_{16}ClN_3O$ (percent): C, 65.05; H, 5.14, N, 13.39. Found (percent): C, 65.09; H, 5.49; N, 13.61.

2,3,4,6 - tetrahydro - 6 - (4-tolyl)-pyrimido[2,1-a]isoindol-6-ol, M.P. 237–9° C. dec., as a white crystalline solid which is insoluble in water and soluble in dimethylacetamide.

*Analysis.*—Calc'd. for $C_{18}H_{18}N_2O$ (percent): C, 77.67; H, 6.52; N, 10.07. Found (percent): C, 77.62; H, 6.48; N, 9.94.

EXAMPLE V

Employing the procedure described in Examples I to IV to react 2,3,4,6 - tetrahydropyrimindo[2,1-a]isoindol-6-one with an appropriate lithium compound the following products are obtained:

6-isobutyl-2,3,4,6-tetrahydropyrimido[2,1-a]isoindol-6-ol;

6-(4-butylphenyl)-2,3,4,6-tetrahydropyrimido[2,1-a]isoindol-6-ol;

2,3,4,6-tetrahydro-6-(3,5-dimethylphenyl)pyrimido[2,1-a]isoindol-6-ol;

6-(4-ethoxyphenyl)-2,3,4,6-tetrahydropyrimido[2,1-a]isoindol-6-ol;

6-(4-butyl-3-methylphenyl)-2,3,4,6-tetrahydropyrimido[2,1-a]isoindol-6-ol;

2,3,4,6-tetrahydro-6-(2-thienyl)pyrimido[2,1-a]isoindol-6-ol;

6-(4-trifluoromethylphenyl)-2,3,4,6-tetrahydropyrimido[2,1-a]isoindol-6-ol; and 2,3,4,6-tetrahydro-6-(2,4-dimethoxyphenyl)pyrimido[2,1-a]isoindol-6-ol.

What is claimed is:

1. A process for the preparation of compounds having the formula:

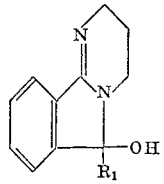

wherein $R_1$ is selected from the group consisting of hydrogen, lower alkyl, phen(lower)alkyl, phenyl, monohalophenyl, dihalophenyl, mono(lower)alkylphenyl, di-(lower)alkylphenyl, trifluoromethylphenyl, mono(lower)alkoxyphenyl, di(lower)alkoxyphenyl, thienyl, pyridyl, furyl, and tetrahydro-2-naphthyl which comprises reacting 2,3,4,6 - tetrahydropyrimido[2,1-a]isoindol - 6 - one with a lithium compound of the formula:

LiR wherein R is selected from the group consisting of aluminum hydride, lower alkyl, phenyl, phen(lower)alkyl, monohalophenyl, dihalophenyl, mono(lower)alkylphenyl, di(lower)alkylphenyl, trifluoromethylphenyl, mono(lower)alkoxyphenyl, di(lower) alkoxyphenyl, thienyl, pyridyl, furyl and tetrahydro-2-naphthyl in an anhydrous, reaction-inert, organic solvent at a temperature range from about 30° C. to about 140° C. for a period of about one to about twenty hours.

2. A process as described in claim 1 wherein the anhydrous, reaction-inert, organic solvent is ether and the reaction is conducted at about the reflux temperature of the reaction mixture for a period of about two hours.

3. A process as described in claim 1 for the preparation of a compound wherein $R_1$ is hydrogen, which compound is: 2,3,4,6-tetrahydropyrimido[2,1-a]isoindol-6-ol.

4. A process as described in claim 1 for the preparation of a compound wherein $R_1$ is phenyl, which compound is: 2,3,4,6-tetrahydro-6 - phenyl-pyrimido[2,1-a]isoindol-6-ol.

5. A process as described in claim 1 for the preparation of a compound wherein $R_1$ is methyl, which compound is: 2,3,4,6-tetrahydro-6 - methyl-pyrimido[2,1-a]isoindol-6-ol.

6. A process as described in claim 1 for the preparation of a compound wherein $R_1$ is butyl, which is: 6-butyl-2,3,4,6-tetrahydropyrimido[2,1-a]]isoindol-6-ol.

7. A process as described in claim 1 for the preparation of a compound wherein $R_1$ is 4-chlorophenyl, which compound is: 6-(4-chlorophenyl)-2,3,4,6-tetrahydroyrimido-[2,1-a]isoindol-6-ol.

8. A process as described in claim 1 for the preparation of a compound wherein $R_1$ is 3,4-dichlorophenyl, which compound is 6-(3,4-dichlorophenyl)-2,3,4,6-tetrahydropyrimido[2,1-a]isoindol-6-ol.

9. A process as described in claim 1 for the preparation of a compound wherein $R_1$ is 4-bromophenyl, which compound is: 6-(4-bromophenyl)-2,3,4,6-tetrahydropyrimido-[2,1-a]isoindol-6-ol.

10. A process as described in claim 1 for the preparation of a compound wherein $R_1$ is 5,6,7,8-tetrahydro-2-naphthyl, which compound is: 6-(5,6,7,8-tetrahydro-2-naphthyl)2,3,4,6-tetrahydropyrimido[2,1-a]isoindol-6-ol.

11. A process as described inclaim 1 for the preparation of compound wherein $R_1$ is benzyl, which compound is: 6-benzyl-2,3,4,6 - tetrahydropyrimido[2,1-a]isoindol-6-ol.

12. A process as described in claim 1 for the preparation of a compound wherein $R_1$ is 4-tolyl, which compound is: 2,3,4,6-tetrahydro-6-(4-tolyl)pyrimido[2,1-a]-isoindol-6-ol.

13. A process for the preparation of a compound of the formula which comprises reacting 2,3,4,6-tetrahydropyrimido-[2,1-a]isoindol-6-one with (3-amino-4 - chlorophenyl)-lithium in an anhydrous, reaction-inert, organic solvent at a temperature range from about 30° C. to about 140° C. for a period of about one to about twenty hours.

References Cited

UNITED STATES PATENTS 3,444,181  5/1969  Houlihan _____ 260—309.6

ALEX MAZEL, Primary Examiner

R.V. RUSH, Assistant Examiner

U.S. Cl. X.R.

260—251 R, 256.4 Q, 256.4 H; 424—251